April 7, 1964     R. H. FREDERICKS ETAL     3,128,124
RETRACTABLE SEAT BELT ASSEMBLY
Filed Dec. 19, 1961     2 Sheets-Sheet 1
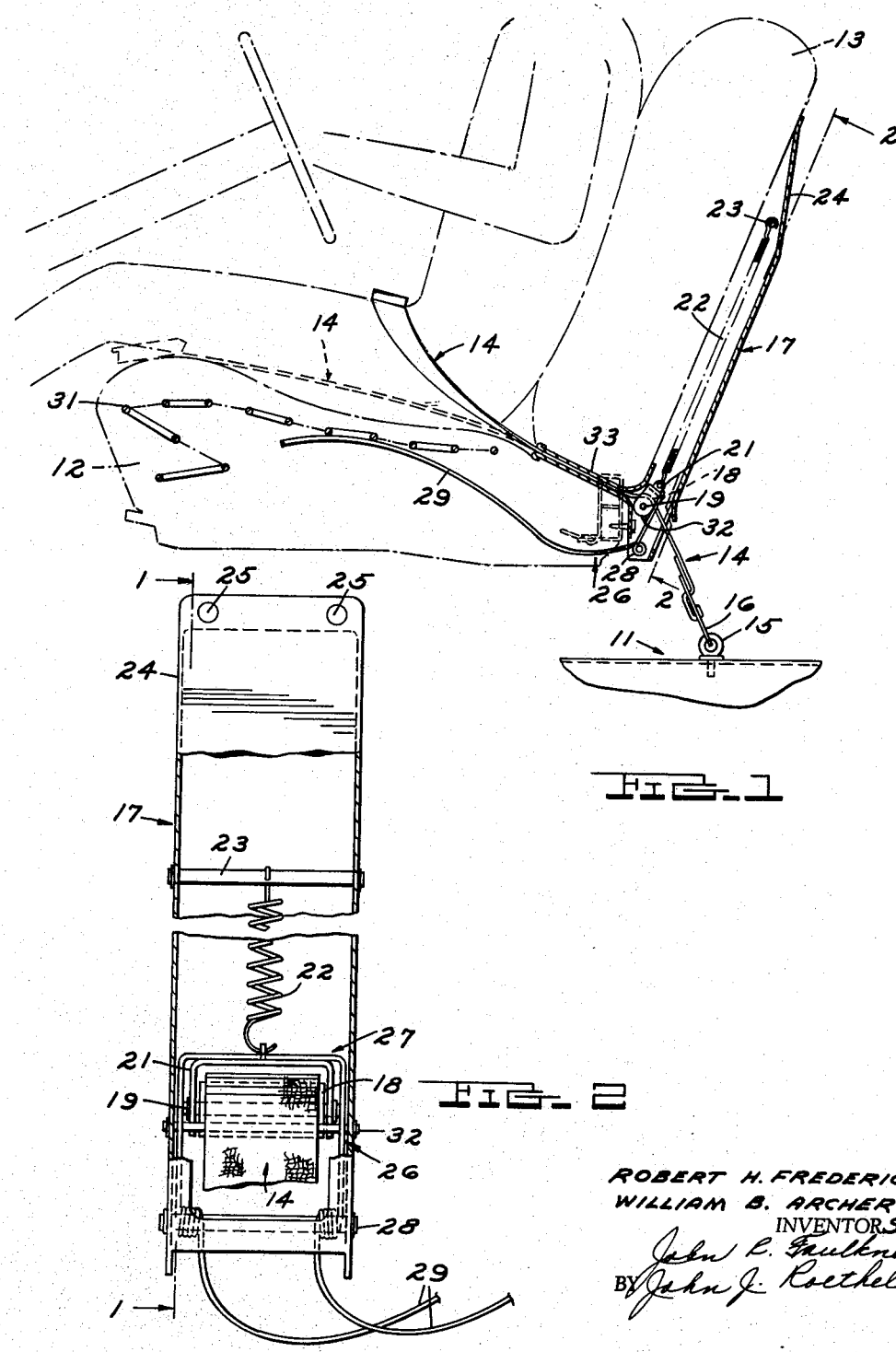
ROBERT H. FREDERICKS
WILLIAM B. ARCHER
INVENTORS
BY John R. Faulkner
John J. Roethel
ATTORNEYS April 7, 1964  R. H. FREDERICKS ETAL  3,128,124
RETRACTABLE SEAT BELT ASSEMBLY
Filed Dec. 19, 1961  2 Sheets-Sheet 2
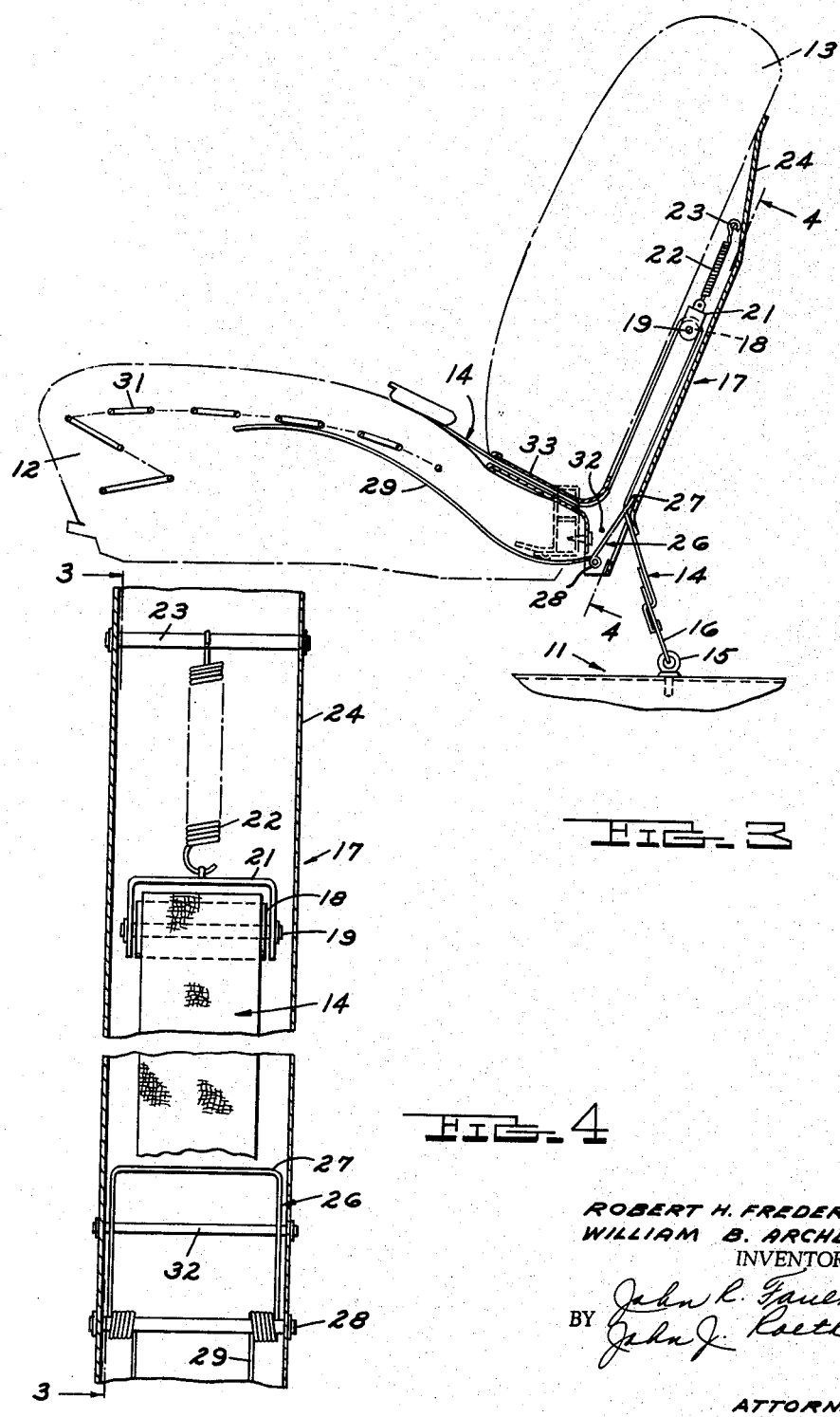
ROBERT H. FREDERICKS
WILLIAM B. ARCHER
INVENTORS
BY
ATTORNEYS

3,128,124
RETRACTABLE SEAT BELT ASSEMBLY
Robert H. Fredericks, Dearborn, and William B. Archer, Inkster, Mich., assignors to Ford Motor Company, Dearborn, Mich., a corporation of Delaware
Filed Dec. 19, 1961, Ser. No. 160,572
5 Claims. (Cl. 297—388)

This invention relates to a position latch for retractable seat belt assemblies and more particularly to a latch that operates in a response to the state of occupancy of the seat.

The proven value of seat belts has prompted governmental and private safety organizations as well as automobile manufacturers to recommend their use. Even though the protection afforded by seat belts is widely recognized, the public has shown apathy toward both the purchase and use of seat belts.

Inconvenience is one of the excuses most often advanced for the failure to use seat belts. The belts, and particularly the portion of the belt that carries the buckle, has a tendency to become lodged between the seat and back rest when not in use. Frequently, when the occupant leaves the seat, the loose end of the belt is brushed off of the seat and becomes caught between the door sill and door.

Devices have been proposed to overcome the aforementioned objections by retracting the seat belt portions, when not in use, into a storage position either under or in back of the seat. The most common form of retraction device utilizes a spring urged member which cooperates with the belt to retract it. It is also desirable that the assembly incorporate a latch mechanism to lock the belt in the extended position. This prevents the spring from exerting a pressure upon the body of the wearer.

The latching mechanisms heretofore proposed require manual engagement by the wearer. This results in increased inconvenience inasmuch as an additional fastening operation is required. The latch, additionally, must be disengaged before the belt can be retracted.

It is, therefore, an object of this invention to provide a latch mechanism for a retractable seat belt assembly that is automatic in operation.

More specifically, it is an object of this invention to provide a latch mechanism for a seat belt assembly that is actuated by means that are sensitive to the state of occupancy of the seat.

In a seat belt assembly incorporating this invention, retraction means cooperate with the seat belt and provide an extended operative position and a retracted storage position for the belt. A latch means maintains the belt in one of the positions. The latch means include means for sensing the state of occupancy of the seat to move the latch means between the engaged and disengaged positions.

Further objects and advantages of this invention will become more apparent as this description proceeds particularly when considered in conjunction with the accompanying drawings, wherein:

FIGURE 1 is a side elevational view of a portion of a motor vehicle seat and seat belt assembly incorporating this invention showing the belt in extended positions.

FIGURE 2 is a cross sectional view taken along line 2—2 of FIGURE 1.

FIGURE 3 is a side elevational view in part similar to FIGURE 1 showing the belt assembly in a retracted position.

FIGURE 4 is a cross sectional view taken along line 4—4 of FIGURE 3.

Referring now in detail to the drawings, there is shown generally at 11 a substantially rigid structural member of the vehicle body, for example the floor pan. Supported upon the floor pan 11 by any suitable means (not shown) is a seat assembly consisting of a seat portion 12 and a back rest portion 13. A seat belt 14 extends from an area between the seat portion 12 and back rest portion 13, across the seat portion 12. One end of the seat belt 14 is rigidly secured to the floor pan 11, as by an eye bolt 15 and an attachment plate 16.

A retraction mechanism indicated generally at 17 controls the position of the seat belt 14. The retraction mechanism 17 includes a roller 18 that is rotatably supported by a pin 19 that is secured to the depending arms of an inverted U-shaped member 21. The seat belt 14 extends from the anchor 15 across the top of roller 18, between the arms of member 21 and forwardly between the seat and back rest portions 12 and 13 of the seat. A tension spring 22 is connected between the U-shaped member 21 and a pin 23 that is secured to a sheet metal container 24. The container 24 encloses the roller 18, U-shaped member 21 and spring 22 and is secured to the back rest portion 13 as by the screw fasteners 25.

The tension spring 22 normally urges the U-shaped member 21 and the roller 18 into an upward position (FIGURES 3 and 4) to cause the seat belt 14 to be retracted into the container 24. If the occupant of the seat pulls upon the ends of the seat belt 14, it will be drawn forwardly across the seat portion 12 against the action of the spring 22 (FIGURES 1 and 2). The seat belt may then be fastened around the wearer as shown in FIGURE 1.

A latch mechanism, indicated generally at 26, is provided to lock the seat belt 14 in the extended position. The latch 26 may be conveniently formed from a substantially rigid wire made in a shape that resembles a mouse trap spring. The latch 26 has a first portion 27 that extends upwardly into the container 24. The portion 27 has a generally inverted U-shape and is adapted at times to extend across the top of the U-shaped member 21 to hold the latter in a downward position (FIGURES 1 and 2). The latch member 26 encircles a pin 28 secured to the container 24 and has a second portion 29 that extends forwardly and inwardly under the upholstered covering of the seat portion 12. The portion 29 of the latch member 26 extends upwardly for contact by the underside of a formed wire spring 31 of the seat portion 12.

The latch 26 is pivotally supported on the pin 28 and is biased normally to an upward position with the portion 29 contacting the seat spring 31. The portion 27 is thereby in the disengaged position (FIGURES 3 and 4). Should a person be present in the seat, the seat spring 31 will deflect exerting a downward pressure on the portion 29 of the latch 26. This causes the latch 26 to pivot about the pin 28 in a counterclockwise direction (FIGURES 1 and 2). A pin 32 secured to the container 24 limits the degree of counterclockwise movement of the latch 26.

As the seat belt 14 is drawn forward, the spring 22 will yield and allow the U-shaped member 21 and roller 18 to move downwardly. When the belt 14 is fully extended, the U-shaped member 21 will bear against the portion 27 of the latch 26 causing it to deflect slightly and allow the U-shaped member 21 and belt 14 to assume the fully extended position (FIGURES 1 and 2). When the U-shaped member 21 is drawn into the fully extended position, the portion 27 of the latch 26 is urged by its spring action into contact with the upper surface of the U-shaped member 21. The member 21 and belt 14 are thereby locked in the extended position.

The belt 14 cannot be retracted by the action of the spring 22 as long as someone is present in the seat to deflect the seat spring 31 and pivot the latch 26 in a counterclockwise direction about the pin 28. When the belt 14 is unbuckled and the occupant leaves the seat, the seat spring 31 will return to the undeflected position. The spring bias of the latch 26 then causes the latch 26 to pivot in a clockwise direction about the pin 28 to release the U-shaped member 21 from the action of the portion 27 of the latch 26. The spring 22 will then draw the U-shaped bracket 21 and roller 18 upwardly into the container 24. This causes the belt 14 to be retracted into the container 24.

To permit free movement of the belt 14 between the retracted and extended positions, container 24 is formed with a guide portion 33 that extends between seat and back rest portions 12 and 13. The belt 14 extends forwardly through the guide portion 33.

It should be apparent that the latch mechanism 26 is fully automatic in its operation due to the action of the pressure sensitive portion 29 of the latch 26. The latch mechanism, therefore, requires no operation on the part of the user.

It is to be understood that the invention is not limited to the exact construction shown and described, but that various changes and modifications may be made within the spirit and scope of the invention as defined by the appended claims.

We claim:

1. In a motor vehicle, a seat, a seat belt adapted to extend over said seat, means anchoring a portion of said belt, retraction means cooperating with said belt to provide an extended operative position and a retracted storage position for said belt, said retraction means including resilient means operative to bias said seat belt into said retracted storage position, latch means pivotally supported for movement from a disengaged position to a position of engagement with said retraction means when said seat belt is in said extended operative position, and means responsive to occupancy of said seat operatively connected to said latch means for causing the latter to pivot from the disengaged position to the engaged position when said seat is occupied.

2. In a motor vehicle, a seat having spring cushion elements, a seat belt adapted to extend over said seat, means anchoring a portion of said belt, retraction means cooperating with said seat belt to provide an extended operative position and a retracted storage position for said seat belt, said retraction means including resilient means operative to bias said seat belt into one of said positions, latch means pivotally supported for movement from a disengaged position to a position of engagement with said retraction means when said seat belt is in the other of said positions, and means operatively connected to at least one of said spring cushion elements of said seat and said latch means for causing the latter to pivot when said spring cushion element seat is deflected by the body of a person occupying said seat.

3. In a motor vehicle, a substantially rigid supporting structure, a seat supported by said supporting structure, a seat belt adapted to extend over said seat, anchor means operatively connecting one end of said seat belt to said supporting structure, retraction means cooperating with said seat belt to provide an extended operative position and a retracted storage position for said seat belt, said retraction means including resilient means operative to bias said seat belt into said retracted storage position, latch means pivotally supported for movement from a disengaged position to a position of engagement with said retraction means when said seat belt is in said extended operative position, and means operatively connected to said seat and said latch means for causing the latter to pivot into engagement with said retraction means when said seat is deflected by the weight of an occupant in said seat and when said seat belt is in said extended operative position.

4. In a vehicle body, a seat mounted within said body having a cushion portion deflectable under the weight of a seat occupant, a seat belt having one end anchored to a structural member of said body and its other end adapted in operative position to extend over said seat, retraction means engaged with said seat belt having a part thereof movable to a predetermined position in response to extension of said seat belt to a fully extended position, and latch means comprising a latch element constructed and arranged to engage said retraction means part when the latter is in said predetermined position to render said retraction means inoperative to retract said seat belt from said fully extended position, said latch means including means connected to said latch element responsive to deflection of said cushion portion to urge the latch element into engagement with said retraction means part, said retraction means being rendered inoperative to retract said seat belt only when said cushion portion of said seat is deflected by the weight of a seat occupant and said seat belt is in fully extended position.

5. In a vehicle body, a seat mounted within said body having a seat cushion and a back rest, said seat cushion having a cushioned portion deflectable under the weight of a seat occupant, a seat belt having one end anchored to a structural member of said body and its other end adapted in operative position to extend over said seat cushion, retraction means comprising biasing means mounted on said back rest and a connecting means coupling said biasing means to said seat belt, said connecting means being movable to a predetermined position in response to extension of said seat belt to a fully extended position, and latch means comprising a latch element constructed and arranged for movement into engagement with said connecting means when the latter is in said predetermined position to render said retraction means inoperative to retract said seat belt from said fully extended position, said latch means including an operating member coupled to said latch element and responsive to deflection of said seat cushion portion to urge said latch element into engagement with said connecting means, said retraction means being rendered inoperative to retract said seat belt only when said cushion portion of said seat cushion is deflected by the weight of a seat occupant and seat belt is in said fully extended position.

References Cited in the file of this patent

UNITED STATES PATENTS

| | | |
|---|---|---|
| 2,830,655 | Lalande | Apr. 15, 1958 |
| 2,963,080 | Zang | Dec. 6, 1960 |
| 3,032,374 | Robinson | May 1, 1962 |